US007517705B2

(12) United States Patent
Dorn et al.

(10) Patent No.: US 7,517,705 B2
(45) Date of Patent: Apr. 14, 2009

(54) PHOSPHORUS-CONTAINING POLYMERS FOR OPTICAL SIGNAL TRANSDUCERS

(75) Inventors: Ingmar Dorn, Cologne (DE); Burkhard Kohler, Leverkusen (DE)

(73) Assignee: Bayer Aktiengesellschaft, Leverkusen-Bayerwerk (DE)

( * ) Notice: Subject to any disclaimer, the term of this patent is extended or adjusted under 35 U.S.C. 154(b) by 192 days.

(21) Appl. No.: 11/507,329

(22) Filed: Aug. 21, 2006

(65) Prior Publication Data
US 2006/0287453 A1 Dec. 21, 2006

Related U.S. Application Data

(62) Division of application No. 10/081,628, filed on Feb. 20, 2002, now Pat. No. 7,101,945.

(30) Foreign Application Priority Data
Feb. 22, 2001 (DE) ................ 101 08 483

(51) Int. Cl.
*H01L 21/02* (2006.01)
*C08F 130/02* (2006.01)
(52) U.S. Cl. .................. 438/7; 438/104; 525/327.2; 525/328.2; 525/328.4; 525/328.8; 525/328.9; 525/340; 526/274; 526/277; 526/278; 428/357
(58) Field of Classification Search .......... 438/7, 438/104; 428/357; 526/274, 277, 278; 525/327.4, 525/328.2, 328.4, 328.8, 328.9, 340
See application file for complete search history.

(56) References Cited

U.S. PATENT DOCUMENTS

| 4,204,037 | A | 5/1980 | Frosch et al. |
| 4,308,079 | A | 12/1981 | Venables et al. |
| 4,678,840 | A | 7/1987 | Fong et al. |
| 4,815,843 | A | 3/1989 | Tiefenthaler et al. |
| 4,904,634 | A | 2/1990 | Wieserman et al. |
| 4,950,712 | A | 8/1990 | Letourneur et al. |
| 5,019,269 | A | 5/1991 | Letourneur et al. |
| 5,041,496 | A | 8/1991 | Engelhardt et al. |
| 5,171,264 | A | 12/1992 | Merrill |
| 5,204,239 | A | 4/1993 | Gitler et al. |
| 5,442,169 | A | 8/1995 | Kunz |
| 5,919,712 | A | 7/1999 | Herron et al. |
| 5,959,292 | A | 9/1999 | Duveneck et al. |
| 6,289,144 | B1 | 9/2001 | Neuschafer et al. |
| 6,974,707 | B1 | 12/2005 | Barie et al. |

FOREIGN PATENT DOCUMENTS

| DE | 42 27 019 | 2/1994 |
| DE | 198 18 360 C2 | 4/1999 |
| EP | 0 238 853 | 9/1987 |
| EP | 0 304 377 | 2/1989 |
| EP | 0 596 421 A1 | 5/1994 |
| EP | 0759159 | 2/1997 |
| EP | 0 887 645 A1 | 12/1998 |
| GB | 2221466 A | 2/1990 |
| JP | 53115794 | 10/1978 |
| JP | 2000-327386 | 11/2000 |
| WO | WO-9520151 | 7/1995 |
| WO | WO-96/35940 | 11/1996 |

OTHER PUBLICATIONS

Buckland, R.M., *Strong signals from streptavidin—biotin*, Nature 320, pp. 557-558 (1986).
Porath, J., "*Immobilized Metal Ion Affinity Chromatography*," Protein Expression and Purification 3; pp. 263-281 (1992).
Piehler, J., et al., "*Surface modification for direct immoprobes*," Biosensors & Bioelectronics 11, pp. 579-590 (1996).
Mosquet, M., et al., "Polyoxyethylene Di-Phosphonates as Efficient Dispersing Polymers for Aqueous Suspensions," J. Applied Polymer Science 65, pp. 2545-2555 (1997).
Clerc, D., et al., "Direct immunosensing with an integrated-optical output grating coupler," Sensors and Actuators B 40, pp. 53-58 (1997).
Beste, G., et al., "Small antibody-like proteins with prescribed ligand specificities derived from the lipocalin fold," Proc. Natl. Acad. Sci. USA 96, pp. 1898-1903 (1999).
Brovelli, D., et al., "Highly Oriented, Self-Assembled Alkane-phosphate Monolayers on Tantalum (V) Oxide Surfaces," Langmuir 15, pp. 4324-4327 (1999).
Budach, W., et al., "Planar Waveguides as High-Performance Sensing Platforms for Fluorescence-Based Multiplexed Oligonucleotide Hybridization Assays," Anal. Chem. 71, pp. 3347-3355 (1999).
Schneider, B. H., et al., "*Highly sensitive optical chip immunoassays in human serum*," Biosensors & Bioelectronics 15, pp. 13-22 (2000).
Kenausis, G. L., et al., "Poly (L-lysine)-g-Poly (ethylene glycol) Layers on Metal Oxide Surfaces: Attachment Mechanism and Effects of Polymer Architecture on Resistance to Protein Adsorption," J. Phys. Chem. B104; pp. 3298-3309 (2000).
Dumazet-Bonnamour, I., et al., "Colloidal dispersion of magnetite nanoparticles via in situ preparation with sodium polyoxyalkylene di-phosphonates," Colloids and Surfaces A: Physiological and Engineering Aspects 173; pp. 61-71 (2000).
Anikin et al., *Makromolekulare Chemie* 194, (1993), pp. 2663-2673.
Chen et al, Biomedical Microdevicess (1998), 1(2), 155-166.
Yang et al., Biosensors & Bioelectronics (2000), 15(5-6), 221-227.
Skerra et al., "Applications of a peptide ligand for streptavidin: the Strep-tag," *Biomolecular Engineering* 16, pp. 79-86 (1999).

*Primary Examiner*—Helen L Pezzuto
(74) *Attorney, Agent, or Firm*—Connolly Bove Lodge & Hutz LLP

(57) ABSTRACT

The invention relates to a phosphorus-containing polymer for coating dielectric materials, to processes for its preparation and to its use, as well as to an optical signal transducer having a coating of the polymer and to its use.

18 Claims, No Drawings

PHOSPHORUS-CONTAINING POLYMERS FOR OPTICAL SIGNAL TRANSDUCERS

CROSS-REFERENCE TO RELATED APPLICATIONS

This application is a divisional application, and claims priority under 35 U.S.C. §120, of copending U.S. patent application Ser. No. 10/081,628, filed Feb. 20, 2002.

The invention relates to a phosphorus-containing polymer for coating dielectric materials, to processes for its preparation and to its use, as well as to an optical signal transducer having a coating of the polymer and to its use.

Dielectric materials are coated with multifunctional polymers for bio- and chemofunctionalization, i.e. to make it possible for chemical and/or biochemical ((bio-)chemical) recognition elements, e.g. receptors, antibodies, DNA etc., to be immobilized on their surface. Such coated dielectric materials, e.g. coated optical waveguides, are employed as signal transducers such as are used in sensor technology for bio- or chemosensors.

"Bio- or chemosensors" describes devices which, with the aid of a signal transducer and a recognition reaction, can detect an analyte qualitatively or quantitatively. "Recognition reaction" describes quite generally the specific binding or reaction of a so-called analyte to/with a so-called recognition element. Examples of recognition reactions are the binding of ligands to complexes, the sequestration of ions, the binding of ligands to (biological) receptors, membrane receptors or ion channels, of antigens or haptens to antibodies, of substrates to enzymes, of DNA or RNA to specific proteins, the hybridization of DNA/RNA/PNA or the processing of substrates by enzymes. Analytes may be: ions, proteins, natural or artificial antigens or haptens, hormones, cytokines, mono- and oligosaccharides, metabolic products, or other biochemical markers that are used in diagnosis, ensign substrates, DNA, RNA, PNA, potential active agents, medicaments, cells, viruses. Examples of recognition elements are: sequestrants for metals/metal ions, cyclodextrins, crown ethers, antibodies, antibody fragments, anticalines[1], enzymes, DNA, RNA, PNA, DNA/RNA-binding proteins, enzymes, receptors, membrane receptors, ion channels, cell adhesion proteins, gangliosides, mono- or oligosaccharides.

These bio- or chemosensors can be used in environmental analysis, the food industry, human and veterinary diagnosis and crop protection, in order to determine analytes qualitatively and/or quantitatively. The specificity of the recognition reaction also makes it possible to determine analytes qualitatively or quantitatively in complex samples, e.g. ambient air, contaminated water or bodily fluids without, or only with minor, preliminary purification. Furthermore, bio- or chemosensors can also be used in (bio-)chemical research and active agent testing, in order to study the interaction between two different substances (e.g. between proteins, DNA, RNA, or biologically active substances and proteins, DNA, RNA etc.).

The recognition reaction can be integrated with the transducer, to form a bio- or chemosensor, by immobilizing the recognition element or the analyte on the surface of the signal transducer. The recognition reaction, i.e. the binding or reaction of the analyte with the recognition element, changes the optical properties of the medium directly at the surface of the signal transducer (e.g. change in the optical refractive index, absorption, fluorescence, phosphorescence, luminescence etc.), and this is converted into a measurement signal by the signal transducer.

Optical waveguides are a class of signal transducers with which the change in the optical properties of a medium that adjoins a wave-guiding layer, typically a dielectric, can be detected. If light is conducted as a guided mode in the wave-guiding layer, the light field does not terminate abruptly at the medium/waveguide interface, but instead decays exponentially in the so-called detection medium adjoining the waveguide. This exponentially decaying light field is referred to as an evanescent field. If use is made of very thin waveguides whose refractive index differs as much as possible from that of the adjoining medium, decay lengths of the evanescent field (intensity decreases to the value 1/e) <200 nm are achieved. If the optical properties of the medium (e.g. change in the optical refractive index[2,3], luminescence[4,5,6] etc.) adjoining the medium change within the evanescent field, this can be detected via a suitable measurement layout. In this case, it is crucial for the use of waveguides as signal transducers in bio- or chemosensors that the change in the optical properties of the medium be detected only very close to the surface of the waveguide. Specifically, if the recognition element or the analyte is immobilized on the surface of the waveguide, the binding to the recognition element or the reaction of the recognition element can be detected in a surface-sensitive way when the optical properties of the detection medium (liquid, solid, gas) change at the interface with the waveguide.

When optical waveguides are being used as bio- or chemosensors, the waveguide/detection-medium interface is subject to stringent requirements:

The waveguide/detection-medium interface must be stable under the reaction conditions of the recognition reaction.

The recognition elements must be immobilized within the range of the evanescent field of the waveguide.

The immobilization of the recognition element must be stable under the reaction conditions of the recognition reaction.

The functionality of the recognition elements must still be present after the immobilization.

So that only the specific recognition reaction is detected by the signal transducer, any kind of non-specific binding to the waveguide/detection-medium interface must be suppressed.

Recognition elements can be immobilized on the surface of waveguides in a wide variety of ways. This may be done e.g. by physisorption of the recognition elements on the signal-transducer surface. Clerc and Lukosz[7] describe the physisorption of avidin on $SiO_2$—$TiO_2$ waveguide surfaces. In a second step, by utilizing the high-affinity avidin-biotin binding, biotinylated antibodies can be immobilized on the avidin layers applied in this way. A disadvantage with this method of immobilizing recognition elements on waveguide surfaces is the instability of the physisorbed avidin layer. A change in the reaction conditions, e.g. temperature changes, pH changes, addition of detergents etc., can cause desorption of the avidin layer and therefore of the antibody as well.

The recognition elements may also be covalently bonded to the surface of a waveguide. One possibility for this is provided by bifunctional silanes, which form a covalent bond with the waveguide surface[8]. The recognition elements, e.g. proteins or DNA[9], can then be covalently bonded via a second functional group in this silane. These bifunctional silanes are highly reactive and the covalent bonding to the waveguide surface must be carried out under strictly dry reaction conditions in order to avoid hydrolysis of the reactive silane. The bonding of the recognition elements, via these silanes, to the waveguide surfaces is stable under acidic, neutral and mildly alkaline conditions. At pH values above 9, however, hydrolysis of the silanes can take place, which may cause desorption of the recognition elements from the surface. Another disadvantage with this immobilization method involves the relatively high non-specific adsorption of proteins, e.g. albumin, onto the waveguide surfaces functionalized in this way[10]. The non-specific binding to these waveguide surfaces can be reduced if blocking agents, e.g. polyethylene glycols[11], are bound to the surface in a second step after the binding of the recognition elements.

As an alternative, the binding of hydrophilic polymers, e.g. polyacrylamides, dextrans, polyethylene glycols etc. to previously silanised waveguide surfaces is described[12]. The purpose of these polymers is to minimize the non-specific binding of proteins etc. to the surface. The recognition elements are then covalently bonded to these polymers in a further step. A problem with this surface functionalization is that several steps need to be carried out for immobilizing the recognition elements on the surface, and that the binding of the silanes to the waveguide surfaces is unstable at pH>9.

The recognition elements can also be bonded to polymers which, without prior silanisation, are applied directly to the waveguide layers. Charged copolymers based on polylysine and polyethylene glycol are adsorbed electrostatically onto some metal oxide surfaces[13], such as $TiO_2$, $Si_{0.4}Ti_{0.6}O_2$ and $Nb_2O_5$. By using optical waveguides, it can be shown that these polymers minimize the non-specific binding of proteins to the waveguide surfaces. Use of these copolymers in biosensor technology is discussed by the authors. A disadvantage of this method involves the instability of these layers at pH values below 3 and above 9, and at high salt concentrations, since, under these conditions, the electrostatically bound polymer is desorbed from the surface.

Polymers which are either derivatized with photoactivatable groups[14] or are incubated together with photocrosslinkers[15,16] can, by photoreaction, be applied directly to the waveguide surface and crosslinked with one another. These polymer layers exhibit low non-specific adsorption of proteins and are stable over a wide range of reaction conditions. The recognition elements can be bound either during the photoreaction or after the photoreaction. For the latter immobilization, use is made of polymers which, besides the photoreactive groups, also carry functional groups which permit covalent immobilization of the recognition elements. The photoreactive compounds need to be applied to the surface either by spotter or spin coating and concentrated or dried thereon. This can lead to partial dewetting of the waveguide surface, which results in incomplete coverage.

The coating of $Ta_2O_5$ waveguide surfaces with long-chain alkyl phosphates of the general formula $H_2O_3P$—O—$(CH_2)_n$—$CH_3$ is described in the scientific literature[17]. It can be shown that these long-chain phosphates form tightly packed monolayers (so-called self-assembled monolayers) on the surface of the waveguides. Without further presentation of experiments, it has been proposed to use ω-functionalized long-chain alkyl phosphates in biosensor technology, in which case the functional group in the ω position is intended to point away from the waveguide surface and recognition elements could be bound via this functional group.

U.S. Pat. No. 4,904,634[18] describes an active material which can be used as an adsorbent. This material consists of a metal oxide/hydroxide surface and a monolayer of a phosphorus-containing organic material chemically bound to it. The phosphorus-containing organic material is further specified therein as follows:

the organic material has 1-2 phosphorus-containing groups.

the phosphorus-containing groups have the general formula $RPO(OH)_2$ or $RR'PO(OH)$, where R comprises a group containing 1 to 30 carbon atoms and R' comprises either hydrogen or a group containing 1 to 30 carbon atoms.

R and R' may also comprise an organic radical from the group of long- or short-chain aliphatic hydrocarbons, aromatic hydrocarbons, carboxylic acids, aldehydes, ketones, amines, amides, thioamides, imides, lactams, anilines, pyridines, piperidines, carbohydrates, esters, lactones, ethers, alkenes, alkynes, alcohols, nitriles, oximes, organosilicones, ureas, thioureas, perfluoro compounds (organic), perchloro compounds, perbromo compounds and combinations of these groups.

R or R' may also have a functional group at a position in the molecule which is spaced apart from the phosphorus-containing group. The functional group may be a carboxyl, glucose, cyano, cyanate, isocyanate, thiocyanate, phenyl, diphenyl, tertiary butyl, sulphonic acid, benzylsulphonic, halogen, nitrate, phosphate, phosphinate, phosphinite, phosphonate, hydroxymethylamide, alkoxymethylamide, benzophenone, azide, triazene, acylphosphane, quaternary ammonium group or combinations of these groups.

R or R' may also carry a cation exchange group, such as —$HSO_3$, —$N(CH_3)_3Cl$, —COONa, —$NH_2$ and —CN.

R may also be an oligomer which is made up of 2-4 monomers and has a molar mass <2000 g/mol.

As an application, reference is made to an active material which is suitable as an adsorbent. Other applications which are mentioned are:

Support material for chromatography.

Ion exchange material.

Coupling element for biological material, such as enzymes, antibodies, cells, yeasts, proteins, microbes, pharmaceuticals, vaccines.

Coating of piezoelectric crystals.

Coatings for passivation of biological implants (bones etc.).

Additives of medicinal products.

In the Patent Application GB 2 221 466[19], the same author describes biologically active particles which are made up of a metal oxide/hydroxide core whose surface has functionalized organophosphorus compounds, such as described in U.S. Pat. No. 4,904,634, bound to it. The patent relates exclusively to biologically active particles.

U.S. Pat. No. 4,308,079[20] describes corrosion inhibitors for aluminium oxide surfaces. As inhibitors, use is made of aminophosphonates which have the following general structure: $NR_3$, $NHR_2$, $R'NR_2$, $(CH_2NR_2)_2$, and $R_2NCH_2CH_2NRCH_2CH_2NR_2$, wherein R is $CH_2PO(OH)_2$ and R' is an alkyl chain group having from 1 to 5 carbon atoms. Other applications are not described.

Polyoxyalkylene diphosphonates, which can be used to improve the dispersion of calcium carbonate[21] and magnetite nanoparticles[22], are described in the scientific literature. Polymers of the structure H—$(OCH_2CH_2)_n$—$N(CH_3)$—$CH_2$—$PO_3H_2$ and H—$(OCH_2CH_2)_n$—$N(CH_2PO_3H_2)_2$ with 20<n<70, which build up a polymer layer on the surface of the nanoparticles, are used for this purpose. If these polymers are actually added during the synthesis of the nanoparticles, a narrow size distribution is observed. A further chemical modification, as well as binding of biologically active agents to these polymer-coated nanoparticles, is discussed.

Apart from the disadvantages, described in the prior art, which need to be avoided, the waveguide/detection-medium interface is subject to stringent requirements when optical waveguides are being used as bio- or chemosensors:

The waveguide/detection-medium interface must be stable under the reaction conditions of the recognition reaction.

Recognition elements must be immobilized within the range of the evanescent field of the waveguide.

The immobilization of the recognition elements must be stable under the reaction conditions of the recognition reaction.

The functionality of the recognition elements must still be present after the immobilization.

So that only the specific recognition reaction is detected by the signal transducer, any kind of non-specific binding of the elements today recognized to the waveguide/detection-medium interface must be suppressed.

The invention relates to a phosphorus-containing polymer, suitable for coating dielectric surfaces, of the general formula I or II,

$$P(A)_m(F)_{n1}(U)_{o1} \quad (I)$$

$$P(A)_m(UF_{n2})_{o2} \quad (II)$$

in which

P stands for a linear or branched, uncrosslinked or crosslinked, homo- or heteropolymeric polymer component, A stands for identical or different phosphorus-containing groups bonded to P, m stands for a number from 3 to approximately 1000, F stands for identical or different functional groups bonded directly or indirectly to P, which are present in addition to A, n1 stands for a number from 1 to approximately 1000, n2 stands for a number from 1 to approximately 100, U stands for identical or different, linear or branched, uncrosslinked or crosslinked oligomeric or polymeric segments, made up of identical or different monomers, which are bonded to P, o1 stands for a number from 0 to approximately 1000, o2 stands for a number from 1 to approximately 1000.

The polymer according to the invention is suitable for coating dielectric materials, in particular dielectric waveguide surfaces. The thickness of the coating is usually between 0.5 and 700 nm, preferably between 0.5 and 200 nm, in particular between 0.5 and 10 nm.

The invention secondly relates to a process for preparing a polymer according to the invention by copolymerizing (A) a monomer containing a phosphorus-containing group A, or a plurality of identical or different monomers containing identical or different phosphorus-containing groups A
with (B) a monomer containing a functional group F, or a plurality of identical or different monomers containing identical or different functional groups F, and (C) optionally, a monomer containing a segment U, or a plurality of identical or different monomers containing identical or different segments U, to form a polymer of the formula I, or with (B') a monomer containing a unit $(UF_{n2})_{o2}$ according to formula II, or a plurality of identical or different monomers containing identical or different units of the formula $(UF_{n2})_{o2}$ according to formula II, to form a polymer of the formula II.

The invention thirdly relates to a process for preparing a polymer according to the invention by (i) preparing a polymer, which forms the polymer component P and carries identical or different functional groups that are suitable as functional groups F, preferably hydroxyl groups, carboxyl groups, derivatives of carboxyl groups and/or amine groups, (ii) reacting some of the functional groups to form identical or different phosphorus-containing groups A, and (iii) optionally, reacting some of the functional groups to form identical or different segments U, wherein step (iii) can be carried out after, before or together with step (ii), and wherein not all the functional groups are converted in steps (ii) and (iii), and the unreacted functional groups form the functional groups F of the polymer. In this case, some or all of the functional groups that have not been converted in steps (ii) and (iii) may be reacted with one or more identical or different crosslinkers to form functional groups F.

The invention fourthly relates to the use of a polymer according to the invention for coating dielectric materials, in particular dielectric waveguides. In this case, the polymer may be used for coating dielectric materials, in particular dielectric waveguides, made of $TiO_2$, $Ta_2O_5$, $ZrO_2$, $HfO_2$ or $Al_2O_3$, preferably of $TiO_2$ or $Ta_2O_5$.

The invention fifthly relates to an optical signal transducer having a coated dielectric waveguide, whose coating consists of a polymer according to the invention.

The invention sixthly relates to the use of an optical signal transducer having a coated dielectric waveguide according to the invention for immobilizing chemical and/or biochemical recognition elements.

The phosphorus-containing polymer according to the invention contains various functional groups or segments for satisfying the said requirements to which the waveguide coating is subject:

The polymer component P.

The phosphorus-containing groups A of the polymer, which ensure stable binding of the polymer to the surface of the waveguide. In this case, preferably between 0.001 and 10 milliequivalents (mEq) of phosphorus-containing groups are present per gram of polymer, in particular from 0.01 to 5 mEq/g, particularly preferably from 0.1 to 3 mEq/g.

The functional groups F of the polymer, via which the recognition elements can be immobilized directly or with the aid of a crosslinker covalently, coordinatively or via another chemical bond onto the polymer, and therefore onto the surface of the bio- or chemosensor. In this case, preferably between 0.001 and 20 milliequivalents (mEq) of functional groups are present per gram of polymer, in particular from 0.01 to 10 mEq/g, particularly preferably from 0.5 to 10 mEq/g.

The segments U, which suppress the non-specific binding of proteins etc. to the polymer, and therefore to the waveguide. U may be omitted from the polymer if the suppression of the non-specific binding is already achieved by the polymer component. In this case, preferably between 0.001 and 20 milliequivalents (mEq) of segments U are present per gram of polymer, in particular from 0.01 to 10 mEq/g, particularly preferably from 0.5 to 10 mEq/g.

The polymers according to the invention may be linear, branched or crosslinked, and have an average molar mass of from 1000 to 10,000,000 g/mol, preferably from 2100 to 1,000,000 g/mol, particularly preferably from 5000 to 500,000 g/mol, most preferably from 5000 to 300,000 g/mol, in particular from 10,000 to 150,000 g/mol. The molar mass may be determined e.g. by vapour-pressure osmosis or light scattering.

Polymer Component P

The polymer components P may be made up statistically or in block fashion. They are typically hydrophilic polymers, the term "hydrophilic polymer" describing, in the scope of the teaching of the invention, a polymer which can be wetted or made to swell with water or aqueous solutions. Examples include:

- Polyvinyl alcohols, polyvinyl amine, polyallyl amine, polyethylene imine, polyacrylates, polyacrylamides, imides of polymaleic anhydride-alt-methyl vinyl ether or derivatives thereof.
- Linear polyethylene glycols, polypropylene glycols or derivatives thereof.
- Branched or star-branched polyethylene glycols, as described e.g. in U.S. Pat. No. 5,171,264[23], to which reference is made in this regard and whose content is hereby included in this application, or derivatives thereof.
- Polyureas, polyurethanes, polyesters, polycarbonates, polyhydroxycarboxylic acids, or derivatives thereof which are made up of diols/polyols and/or diamines/polyamines. The diols/polyols may be polyethylene glycols, polypropylene glycols etc. The diamines/polyamines may be jeffamine, polyethylene imines, polyvinyl amine, polyallyl amine, polyethylene imine, etc.
- Polysaccharides such as cellulose, starch, agarose, dextran, chitosan, hyaluronic acid or derivatives thereof, in particular hydroxyalkyl derivatives or acid semiesters.
- Polypeptides or derivatives thereof which are made up of one or more various amino acids, e.g. polylysine, polyphenylalanine-lysine, polyglutamates, polymethylglutamate-glutamate, polyphenylalanine-glutamate, polyserine, polyglycine, polyserine-glycerine etc.
- Branched polyols based on glycidol, such as e.g. in Patent Applications EP 0 116 978 and WO 00/37532, to both of which reference is made in this regard and whose content is hereby included in this application, or derivatives thereof. Preferred are polyols based on glycidol with a degree of polymerization of 1 to 300, a polydispersity index below 1.7, a content of branched units, based on the sum of all monomeric units and determined by $^{13}$C NMR spectroscopy, of 10 to 33 mol %.

Phosphorus-Containing Groups A

Stable anchoring of the polymer on the waveguide surface is achieved through several phosphorus-containing groups which are bonded directly, or via a spacer S, to a carbon atom of the polymer component.

The groups A preferably satisfy the formula $$A = S_s Y_p$$

in which
p stands for the number 1 and
s stands for the number 0 (i.e. A=Y) or 1 (i.e. A=SY)
or
p stands for the numbers 2, 3, 4, 5 or 6 and
s stands for the number 1 (i.e. $A=SY_p$)
and in which the group or groups Y is/are selected from the following phosphorus-containing radicals:

—O(R'O)PO$_2$H, —P(R'O)O$_2$H, —N(CH$_2$—P(R'O)O$_2$H)$_2$, —N(R')—CH$_2$—P(R'O)O$_2$H, —CH(P(R'O)O$_2$H)N(CH$_2$—P(R'O)O$_2$H)$_2$, —CH(CH$_2$—P(R'O)O$_2$H)$_2$, —CR'(CH$_2$—P(R'O)O$_2$H)$_2$, —C(CH$_2$—P(R'O)O$_2$H)$_3$, where R' stands for —H, —CH$_3$ or —C$_2$H$_5$.

The polymer preferably contains one or more of the following groups Y:

—O(R'O)PO$_2$H, —P(R'O)O$_2$H, —N(CH$_2$—P(R'O)O$_2$H)$_2$, in particular —N(CH$_2$—P(R'O)O$_2$H)$_2$, where R' preferably stands for —H.

The spacer S is directly coupled to a C atom of the polymer and carries p identical or different phosphorus-containing radicals Y. According to the invention, the following spacers are preferred (group(s) Y are also indicated):

—(CH$_2$)$_q$—(O—CH$_2$—CH$_2$)$_r$—Y, —(CH$_2$)$_q$—(O—CH$_2$—CH$_2$—CH$_2$)$_r$—Y, —(CH$_2$)$_q$—(O—CH$_2$—CH$_2$)$_r$—C$_6$H$_4$Y, —(CH$_2$)$_q$—(O—CH$_2$—CH$_2$)$_r$—C$_6$H$_3$Y$_2$, —(CH$_2$)$_q$—(O—CH$_2$—CH$_2$)$_r$—C$_6$H$_2$Y$_3$, where q stands for numbers from 0 to 20 and r stands for numbers from 0 to 100.

In a particular embodiment, the polymer according to the invention contains phosphorus-containing groups A in the form of a spacer S carrying from one to six identical or different phosphorus-containing radicals.

The following groups A, which are coupled directly to a C atom of the polymer, are preferred:

—PO$_3$H$_2$, —NH—CH$_2$—CH$_2$—PO$_3$H$_2$, —CH$_2$—N(CH$_2$—PO$_3$H$_2$)$_2$, —N(CH$_2$—PO$_3$H$_2$)$_2$, —(CH$_2$)$_4$N(CH$_2$—PO$_3$H$_2$)$_2$, —OPO$_3$H$_2$.

Functional Groups F for Immobilizing Recognition Elements

F stands for functional groups which are bonded directly to a carbon atom of the polymer, and via which recognition elements can be immobilized directly or with the aid of a crosslinker covalently, coordinatively or via another chemical bond onto the polymer, and therefore onto the surface of the bio- or chemosensor. The direct coupling of the recognition elements can be carried out before the waveguide is coated with the polymer, or after this. Typical functional groups for covalently immobilizing recognition elements are e.g.: carboxylic acid, carboxylic acid ester, carboxylic acid chloride, carboxylic acid anhydride, carboxylic acid nitrophenyl ester, carboxylic acid N-hydroxysuccinimide, carboxylic acid imidazolide, carboxylic acid pentafluorophenyl ester, hydroxyl, toluenesulphonyl, trifluoromethylsulphonyl, epoxy, aldehyde, ketone, β-dicarbonyl, isocyanate, thioisocyanate, nitrile, amine, aziridine, hydrazine, hydrazide, nitro, thiol, disulphide, thiosulphite, halogen, iodoacetamide, bromoacetamide, chloroacetamide, boric acid ester, maleimide, α,β-unsaturated carbonyls, phosphate, phosphonate, hydroxymethylamide, alkoxymethylamide, benzophenone, azide, triazene, acylphosphane.

Alternatively, the recognition elements may also be coordinatively immobilized onto the polymer. Typical groups for this are, for example: iminodiacetic acid, nitrilotriacetic acid.

Alternatively, biochemical recognition reactions may be used to immobilize recognition elements onto the polymer. To that end, the following groups may be bonded to the polymer: StrepTag[24], digoxin, digoxigenin, biotin, thiobiotin, fluorescein, dinitrophenol, streptavidin, avidin, etc.

In a particular embodiment, the polymer according to the invention contains functional groups F with crosslinkers, which may be bonded to the polymer before or after the waveguides are coated. These crosslinkers may be linear, branched or crosslinked molecules, oligomers or polymers having a molar mass, or average molar mass, of from 50 to 50,000, which carry two or more identical or different functional groups, or other commercial crosslinkers. Preferred crosslinkers can be described generally by the formula $$P1(F1)_m(F2)_n$$

with m, n=0, 1, 2, . . . 100, preferably with m+n≧2, preferably with m, n=1, 2 or 3.

P1 maybe:

Linear or branched alkyl or aryl radicals having 1-10 C atoms.

Linear polyethylene glycols, polypropylene glycols, copolymers of these polymers or derivatives thereof.

Branched or star-branched polyethylene glycols, as described e.g. in U.S. Pat. No. 5,171,264[25], to which reference is made in this regard and whose content is hereby included in this application, or derivatives thereof.

Polysaccharides such as cellulose, starch, agarose, dextran, chitosan, hyaluronic acid or derivatives thereof.

Polypeptides or derivatives thereof which are made up of one or more various amino acids, e.g. polylysine, polyphenylalanine-lysine, polyglutamate, polymethylglutamate-glutamate, polyphenylalanine-glutamate, polyserine, polyglycine, polyserine-glycerine etc.

Branched polyols or oligools based on glycidol, such as e.g. in Patent Applications EP 0 116 978 and WO 00/37532, to both of which reference is made in this regard and whose content is hereby included in this application, or derivatives thereof. Preferred are polyols based on glycidol with a degree of polymerization of 1 to 300, a polydispersity index below 1.7, a content of branched units, based on the sum of all monomeric units and determined by $^{13}$C NMR spectroscopy, of 10 to 33 mol %.

F1 are functional groups which permit coupling of the crosslinker to the functional groups F of the polymer. F2 are functional groups to which the recognition elements can be bonded via a covalent, coordinative-or other chemical bond. F1 and F2 may be identical or different functional groups. Examples of the groups F1 and F2 are the following functional groups:

carboxylic acid, carboxylic acid ester, carboxylic acid chloride, carboxylic acid anhydride, carboxylic acid nitrophenyl ester, carboxylic acid N-hydroxysuccinimide, carboxylic acid imidazolide, carboxylic acid pentafluorophenyl ester, hydroxyl, toluenesulphonyl, trifluoromethylsulphonyl, epoxy, aldehyde, ketone, β-dicarbonyl, isocyanate, thioisocyanate, nitrile, amine, aziridine, diazirine, hydrazine, hydrazide, nitro, thiol, dithiol, thiosulphite, halogen, iodoacetamide, bromoacetamide, chloroacetamide, boric acid ester, maleimide, α,β-unsaturated carbonyls, phosphate, phosphonate, hydroxymethylamide, alkoxymethylamide, benzophenone, azide, triazene, acylphosphane.

A preferred crosslinker of formula $P1(F1)_m(F2)_n$ is ethylene glycol bis-succinimidyl succinate.

Segments U for Suppressing Non-Specific Binding

The polymer can have segments U which suppress the non-specific binding of proteins etc. to the polymer, and therefore to the waveguide. These segments are covalently bonded to the polymer unit P and may be preferably hydrophilic linear, branched or crosslinked oligomers or polymers having a preferred molar mass, or average molar mass, of from 100 to 10,000. Examples of such segments are:

Linear oligo- or polyethylene glycols, oligo- or polypropylene glycols, copolymers of these oligomers/polymers or derivatives thereof.

Branched or star-branched oligo- and polyethylene glycols, as described e.g. in U.S. Pat. No. 5,171,264[26], to which reference is made in this regard and whose content is hereby included in this application, or derivatives thereof.

Oligo- or polysaccharides such as cellulose, starch, agarose, dextran, chitosan, hyaluronic acid or derivatives thereof.

Oligo- or polypeptides or derivatives thereof which are made up of one or more various amino acids, e.g. polylysine, polyphenylalanine-lysine, polyglutamate, polymethylglutamate-glutamate, polyphenylalanine-glutamate, polyserine, polyglycine, polyserine-glycerine etc.

Branched polyols or oligools based on glycidol, such as e.g. in Patent Applications EP 0 116 978 and WO 00/37532, to both of which reference is made in this regard and whose content is hereby included in this application, or derivatives thereof. Preferred are polyols based on glycidol with a degree of polymerization of 1 to 300, a polydispersity index below 1.7, a content of branched units, based on the sum of all monomeric units and determined by $^{13}$C NMR spectroscopy, of 10 to 33 mol %.

These segments may be omitted from the polymer if the suppression of the non-specific binding is already achieved by the polymer component.

Preparation of the Polymer

The polymer according to the invention can be prepared e.g. by copolymerizing various monomers that contain the groups A, F and U, using processes which are known to an experienced chemical synthesist. For instance, the polymer may be prepared e.g. by copolymerizing vinylphosphonic acid, polyethylene glycol methyl ether acrylate and acrylic acid. The recognition element may then be bound before or after the polymer is applied to the waveguide surface. To that end, the carboxylic acid groups are activated by reaction, e.g. with carbodiimides, and then reacted with nucleophilic functional groups of the recognition element, which leads to covalent bonding of the recognition element to the polymer.

Alternatively, however, known processes may be used to synthesize polymers which have identical or different functional groups F. The phosphorus-containing groups A and, optionally, segments U may then be introduced in further steps. In this case, it is necessary to ensure that only a certain proportion of the groups F are converted. The recognition elements can then be bonded via the remaining groups F. In the case of polymers which carry e.g. hydroxyl groups as functional groups F, the phosphorus-containing groups A may be produced by reaction with polyphosphoric acid. In this case, only some of the hydroxyl groups are converted. The recognition element may then be bound before or after the polymer is applied to the waveguide surface. To that end, the hydroxyl groups are activated by reaction, e.g. with toluenesulphonyl chloride, and then reacted with nucleophilic functional groups of the recognition element, which leads to covalent bonding of the recognition element to the polymer.

The polymer may also be prepared e.g. from polymers which carry the carboxylic acid groups or derivatives thereof. The phosphorus-containing groups A are introduced by reaction e.g. with aminoethylphosphonic acid or $H_2N-(C_6H_4)_2-N(CH_2PO_3H_2)_2$. In this case, only some of the carboxylic acid groups are converted. The recognition element may then be bound before or after the polymer is applied to the waveguide surface. To that end, the carboxylic acid groups are activated by reaction, e.g. with carbodiimides, and then reacted with nucleophilic functional groups of the recognition element, which leads to covalent bonding of the recognition element to the polymer.

If amine-containing polymers, e.g. polyethylene imine, polyvinyl amine, polyallyl amine or polylysine are reacted according to Mannich/Mödritzer with formaldehyde and phosphoric acid, the phosphorus-containing groups A can hence be introduced. In this case, only some of the amine groups are converted. The recognition element may then be bound before or after the polymer is applied to the waveguide surface. To that end, the amine groups are activated by reaction, e.g. with a bifunctional crosslinker such as ethylene glycol bis-succinimidyl succinate. In this case, activated carboxylic acid groups are introduced, to which nucleophilic groups of the recognition element can bond.

Application of the Polymer to the Waveguides

The phosphorus-containing groups A are preferably suitable for anchoring the polymer to waveguides made of materials such as $TiO_2$, $Ta_2O_5$, $ZrO_2$, $HfO_2$, $Al_2O_3$, $SiO_2$ (Si(Ti)$O_2$), $In_2O_3/SnO_2$ (ITO), aluminosilicates, $Nb_2O_5$, vanadium oxides, or mixtures of these materials. The waveguide materials may, however, also be oxides or hydroxides of the following elements that can form oxides or hydroxides: Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, B, Al, Ga, In, Tl, Ge, Sn, Pb, As, Sb, Bi, lanthanides, acting nights and mixtures thereof, as well as mixtures of group IIa (Be, Mg, Ca, Sr, Ba, Ra) and VIb (Se, Te, Po).

The polymer is applied to the waveguide surfaces from organic or aqueous solution. This may be done by incubation in the solution, immersion, spraying, spotting, spin coating or similar standard processes. Typically, solutions of between 0.001 and 1000 g/l, in particular between 0.1 and 10 g/l, are-used and the waveguide surfaces are coated at temperatures of between 0 and 200° C., in particular between 20 and 30° C. The incubation time of the waveguide materials with the polymer solutions may be between 10 s and 48 h, typically between 10 min and 24 h. After the incubation, the waveguides are washed with organic solvents or aqueous solutions and, optionally, derivatized further.

Immobilization of the Recognition Elements on the Polymer

Recognition elements can be immobilized directly or with the aid of a crosslinker covalently, coordinatively or via another chemical bond onto the functional groups F of the polymer, and therefore onto the surface of the bio- or chemosensor. The direct coupling of the recognition elements can be carried out before the waveguide is coated with the polymer, or after this. The recognition elements may be covalently bonded to the functional groups F via their own functional groups, such as carboxylic acid, carboxylic acid ester, carboxylic acid chloride, carboxylic acid anhydride, carboxylic acid nitrophenyl ester, carboxylic acid N-hydroxysuccinimide, carboxylic acid imidazolide, carboxylic acid pentafluorophenyl ester, hydroxyl, toluenesulphonyl, trifluoromethylsulphonyl, epoxy, aldehyde, ketone, β-dicarbonyl, isocyanate, thioisocyanate, nitrile, amine, aziridine, hydrazine, hydrazide, nitro, thiol, disulphide, thiosulphite, halogen, iodoacetamide, bromoacetamide, chloroacetamide, boric acid ester, maleimide, α,β-unsaturated carbonyls, phosphate, phosphonate, hydroxymethylamide, alkoxymethylamide, benzophenone, azide, triazene, acylphosphane. The combination of which functional group of the recognition element reacts with which functional group of the polymer results, from the possibilities, which are known to chemists, for reaction between the functional groups.

Proteins as recognition elements can be immobilized on the polymer e.g. via their amino acid side chains. Especially amino acids, e.g. lysines, cysteines, serines, tyrosines, histidines, glutamates, aspartates, which are localized on the surface of a protein, have functional groups in their side chains which can form a covalent bond with the functional groups of the polymer. Functional groups can also be produced in the recognition elements derivatization (phosphorylation of tyrosines), oxidation (e.g. oxidation of diol units of glycosylated proteins to form aldehyde groups), reduction (e.g. of disulphide bridges to form thiols) or coupling of a crosslinker.

Besides covalent immobilization of the recognition elements onto the polymer, the recognition elements may also be coordinatively bonded to the polymer. For example, proteins such as enzymes, antibody fragments and receptors with special affinity sequences, e.g. the 6xhistidine-tag[27] can be prepared using methods of molecular biology. These affinity sequences have a high affinity and specificity for metal ion complexes, e.g. nickel nitrilotriacetic acid, copper iminodiacetic acid, which may be introduced into the polymer as a functional group F.

Alternatively, biochemical recognition reactions may also be used to immobilize recognition elements onto the polymer. The very specific, high-affinity binding of biotin to streptavidin[28] can be used to immobilize recognition elements onto the polymer. To that end, the functional groups F of the polymer must be e.g. streptavidin. The recognition element is then functionalized with biotin and can hence be bonded to the polymer. Alternatively, the recognition element may be provided by molecular biological or chemical means with a short amino acid sequence, the so-called StrepTag[24], which also has a high specificity and affinity for streptavidin.

Advantages

Multifunctional polymers for bio- and chemofunctionalization chemisorb from organic or aqueous solution onto waveguide surfaces. Owing to the specific binding of the phosphorus-containing groups to waveguide materials, they form a stable layer on the waveguide. The binding is stable over a wide pH range (pH=1 to pH=14), temperature range (0° C. to 100° C.) as well as at high salt concentrations (1M). Even the presence of detergents in the reactions solution does not cause desorption of the polymer from the waveguide surface. Only a monolayer of polymer can be applied on the surface, filly in keeping with chemisorption, since the polymer is bound specifically to the waveguide surface via the phosphorus-containing groups. The thickness of the polymer layers is therefore self-limiting, and can be adjusted in a controlled way through the average molar mass and the chemical structure of the polymer. It is therefore possible to ensure that the recognition elements are immobilized within the evanescent light field, and therefore in the sensitive detection range of the signal transducer.

Special segments of the polymer, or the polymer itself, very effectively prevent the non-specific binding of proteins and other organic as well as inorganic compounds to the waveguide surfaces. This makes it possible to detect very specifically only the desired recognition reaction with the aid of the signal transducer. Therefore, both the specificity of the sensor and the signal-to-noise ratio are improved significantly.

The recognition elements are bound stably to the polymer via covalent, coordinative or other chemical bonds. Desorption of the recognition elements from the polymer is hence avoided. A further effect of the very low non-specific interaction of the polymer with proteins and other organic molecules is that the immobilized recognition elements have a high activity. The recognition elements are bound very specifically to the polymer, and further non-specific interactions of the recognition elements with the polymer, which could reduce the activity of the recognition elements, do not occur, or occur only to a very small extent.

Use

The polymer can be applied to a very wide variety of waveguide materials. Recognition elements can then be immobilized onto the polymer while preserving their activity.

The polymer hence acts as an interface for immobilizing recognition elements on signal transducers, e.g. waveguides. The polymer therefore permits the integration of a recognition reaction and a signal transducer to form a sensor. Owing to the flexible concept of the polymer, it is possible to immobilize very disparate recognition elements, so that the sensor can be used in environmental analysis, the food industry, human and veterinary diagnosis and crop protection, in order to determine analytes qualitatively and/or quantitatively. Since the polymer prevents the non-specific binding of organic, inorganic compounds and macromolecules to the sensor surface, it is also possible to determine analytes qualitatively or quantitatively in complex samples, e.g. ambient air, contaminated water or bodily fluids without, or only with minor, preliminary purification.

Furthermore, the polymer can also be used in (bio-)chemical research and active agent testing, in order to study the interaction between two different substances in parallel or sequentially by means of a suitable signal transducer. It is hence possible to study e.g. the interaction of biologically active substances, e.g. potential active agents, with biomolecules such as proteins, membrane receptors, ion channels, DNA, RNA etc.).

LITERATURE

[1] Beste, G.; Schmidt, F. S.; Stibora, T.; Skerra A.; *Proc. Natl. Acad. Sci.* USA (1999) 96, 1898-1903.

[2] Tiefenthaler et al.; U.S. Pat. No. 4,815,843 (1989).

[3] Kunz, R.; U.S. Pat. No. 5,442,169 (1995).

[4] Duveneck, G. L.; Neuschäfer, D.; Ehrat, M.; U.S. Pat. No. 5,959,292 (1999).

[5] Duveneck, G. L.; Heming, M.; Neuschäfer, D.; Segner, J.; EP 0 759 159 (1995).

[6] Neuschäfer, D.; Duveneck, G. L.; Pawlak, M.; Pieles, U.; Budach, W.; WO 96/35940 (1996).

[7] Clerc, D. and Lukosz, W.; *Sensors and Actuators B* (1997) 40, 53-58.

[8] Bamer, R.; Fattinger, C.; Huber, W.; Hübscher, J.; Schlatter, D.; European Patent Application EP 0 596 421.

[9] Budach, W.; Abel, A. P.; Bruno, A. E.; Neuschäfer, D.; *Anal. Chem.* (1999) 71, 3347-3355.

[10] Piehler, J.; Brecht, A.; Geckeler, K. E.; Gauglitz, G.; *Biosensors & Bioelectronics* (1996) 11, 579-590.

[11] Schneider, B. H.; Dickinson, E. L.; Vach, M. D.; Hoijer, J. V.; Howard, L. V.; *Biosensors & Bioelectronics* (2000) 15, 13-22.

[12] Piehler, J.; Brecht, A.; Geckeler, K. E.; Gauglitz, G.; *Biosensors & Bioelectronics* (1996) 11, 579-590.

[13] Kenausis, G. L.; Vörös, J.; Elbert, D. L.; Huang, N.; Hofer, R.; Ruiz-Taylor, L.; Textor, M.; Hubbel, J. A.; Spencer, N. D.; *J. Phys. Chem. B* (2000) 104, 3298-3309.

[14] Sigrist, H.; Gao, H.; Korth, C.; Moser, M.; Oesch, B.; Kunz, R.; Duebendorfer, J.; European Patent Application EP 0 887 645 (1998).

[15] Herron, J. N.; Christensen, D. A.; Wang, H.; Caldwell, K. D.; Janatová, V.; Huang, S.; U.S. Pat. No. 5,919,712 (1999).

[16] Barié, N.; Gobet, J.; Rapp, M.; Sigrist, H.; Patent Application DE 198 18 360 (1999).

[17] Brovelli, D. et al.; *Langmuir* (1999) 15, 4324-4327.

[18] Wieserman, L. F.; Wefers, K.; Cross, K.; Martin, E. S.; U.S. Pat. No. 4,904,634 (1990).

[19] Wieserman, L. F.; DeYoung, D. H.; Whitesides, G. M.; Patent Application GB 2 221 466 (1990).

[20] Venables, J. D.; Tadros, M. E.; Ditchek, B. M.; U.S. Pat. No. 4,308,079 (1981).

[21] Mosquet, M.; Chevalier, Y.; Brunel, S.; Guicquero, J. P.; Le Perchec, P.; *J. Appl. Poly. Sci.* (1997) 65, 2545-2555.

[22] Dumazet-Bonnamour, I. and Le Perchec, P.; *Colloids and Surfaces* (2000) 173, 61-71.

[23] Merrill, E. W.; U.S. Pat. No. 5,171,264 (1992).

[24] Skerra A.; Schmidt, T. G. M.; *Biomolecular Engineering* (1999) 16, 79-86.

[25] Merrill, E. W.; U.S. Pat. No. 5,171,264 (1992).

[26] Merrill, E. W.; U.S. Pat. No. 5,171,264 (1992).

[27] Porath, J.; *Protein Expr. Purify* (1992) 3, 263-281.

[28] Buckland, R. M.; *Nature* (1986) 320, 557.

EXAMPLES

Example 1

Polymer Made from Phosphonate-Functional Copolymers

A mixture of 50 g of N-methyl-2-pyrrolidone (NMP), 5 g of vinylphosphonic acid, 10 g of triethylamine, 15 g of methacryloxyethyl acetoacetate, 30 g of polyethylene glycol methyl ether acrylate (molar mass 750 g/mol), 0.5 g of azobisisobutyronitrile and 1.5 g of dodecyl mercaptan was heated for 6 h to 65° C. After cooling, the solution was adjusted in ethanol to a concentration of 0.1 mg of polymer per ml of solution, and the waveguide surfaces were incubated in this solution for 18 h. The waveguides were then washed with ethanol and 10 mM (M=mol/l) NaOH. A solution of 2 mg/ml of anti-myoglobin monoclonal mouse antibodies in 10 mM sodium acetate buffer, adjusted to pH=5, was prepared and the waveguide surfaces were incubated in it for 2 h. A 1.5 ng/mm$^2$ surface concentration of antibodies was obtained.

Example 2

Polymer made from Phosphate Esters of Polyvinyl Alcohol

A mixture of 50 g of a 10% strength solution of polyvinyl alcohol (polyvinyl acetate with an 88% degree of saponification and a Hoppler viscosity of 18 for the 4% strength solution in water) in DMSO and 0.1% of polyphosphoric acid was heated for 15 min to 100° C. After cooling, 10 g of succinic anhydride were added to the solution and stirred at 21° C. for 3 h. In the next step, the solution was adjusted in ethanol to a concentration of 1 mg of polymer per ml of solution, and the waveguide surfaces were incubated in this solution for 18 h. The waveguides were then washed with ethanol and 10 mM NaOH. The surface was incubated for 10 min in a solution of 1 M N-hydroxysuccinimide and 1 M N-dimethylaminopropyl-N'-ethyl-carbodiimide hydrochloride in ultrapure water, and then washed with ultrapure water. A solution of 2 mg/ml of anti-myoglobin monoclonal mouse antibodies in 10 mM sodium acetate buffer, adjusted to pH=5, was prepared and the waveguide surfaces were incubated in it for 2 h. A 2.5 ng/mm$^2$ surface concentration of antibodies was obtained.

Example 3

Polymer made from Imidised MSA Copolymers 15.6 g of polymaleic anhydride-alt-methyl vinyl ether (MW (average molar mass)=216,000 g/mol) were added portionwise to a mixture of 9.5 g of 2-(2-aminoethoxy)-ethanol, 1.11 g of aminomethanephosphonic acid, 1 g of triethylamine and 100 ml of water at 70° C. After cooling, the solution was adjusted in ethanol to a concentration of 10 mg of polymer per ml of solution, and the waveguide surfaces were incubated in this solution for 18 h. The waveguides were then washed with ethanol and 10 mM NaOH. The surfaces were incubated in a 10 mg/ml solution of ethylene glycol bissuccinimidyl succinate in DMSO for 30 min and then washed with DMSO and ultrapure water. A solution of 2 mg/ml of anti-human chorionic gonadotropin monoclonal mouse antibodies in 10 mM sodium acetate buffer, adjusted to pH=5, was prepared and the waveguide surfaces were incubated in it for 2 h. A 2.0 ng/mm$^2$ surface concentration of antibodies was obtained.

Example 4

Polymer made from Phosphonate-Functional Copolymers Grafted with Polyglycidol

Preparation of the grafting basis (polyglycidol modified with fatty acid):

A mixture of 28 g of soybean oil fatty acid and 74 g of epoxypropanol (glycidol) was heated for 1 h to 140° C. and then a mixture of 0.4 g of phosphoric acid and 333.5 g of epoxypropanol was added in portions over 6 h. The mixture was then stirred for a further 16 h at 140° C.

A mixture of 20 g of the previously prepared polyglycidol modified with fatty acid, 20 g of methacryloyloxyethyl acetoacetate, 2 g of vinylphosphonic acid, 2 g of triethylamine, 42 g of NMP and 0.4 g of azobisisobutyronitrile was heated for 16 h to 65° C. and for 1 h to 100° C. After cooling, the solution was adjusted in ethanol to a concentration of 3 mg of polymer per ml of solution, and the waveguide surfaces were incubated in this solution for 10 h. The waveguides were then washed with ethanol and 10 mM NaOH. A solution of 2 mg/ml of anti-myoglobin monoclonal mouse antibodies in 10 mM sodium acetate buffer, adjusted to pH=5, was prepared and the waveguide surfaces were incubated in it for 2 h. A 3.5 ng/mm$^2$ surface concentration of antibodies was obtained.

Example 5

Polyglycidol, Derivatized with Maleic Acid Anhydride and Imino-Bis-Methylene Phosphonic Acid Preparation of the thiol derivatized imido-di-methylene phosphonic acid reagent:

A mixture of 100 g of mercapto ethylamine hydrochloride, 150 g phosphonic acid and 170 g of water was heated to 100° C. and over 1 h 287 g of formaldehyde (37% strength) were added dropwise. The mixture was stirred for a further hour and then the solvent was removed under vacuum.

Preparation of the Polyglycidol:

1.88 g of hexadecyl amine were melted in a 250 ml glas reactor heated to 100° C. and reacted with 1.2 g glycidol. Then 0.9 ml of potassium ethoxide solution (25% strength in methanol) was added and excessive methanol removed under vacuum. At 140° C. the residue was dissolved in 15 ml of dry diglyme. At a speed of 25 ml per hour 260 g of glycidol in 350 ml of dry THF were added in portions. Upon completion of the addition the reaction mixture was dissolved in 1200 ml of methanol and neutralized by filtration over an acidic ion exchanger (Amberlite® IR-120). The filtrate was precipitated in 12 l of acetone and the yielded polymer was dried at 80° C. for 12 h under vacuum. 254 g of a colorless, highly viscous liquid with a molar mass of 30,000 g/mol and a polydispersity of 1.23 were received. All molecules comprise the initiator as Kerneinheit and 27% of branched building units.

Subsequently a mixture of 1 g of the previously prepared polyglycidol and 5 g of DMSO was heated to 50° C. Then 0.2 g of maleic acid anhydride was added. After 15 min it was heated to 80° C. and 0.2 g of thiol derivatized imido-bis-methylene phosphonic acid reagent and 0.3 g triethyl amine were added. After 15 min 0.05 g of azoisobutyro nitrile was added and it was stirred for a further 4 h at 80° C. and then for a further hour at 100° C.

After cooling, the solution was adjusted in ethanol to a concentration of 2 mg of polymer per ml of solution, and the waveguide surfaces were incubated in this solution for 16 h. The waveguides were then washed with ethanol and water. The surface was incubated in a solution of 1 M of N-hydroxy succinimide and 1 M of N-dimethyl aminopropyl N'-ethyl carbodiimide hydrochloride in ultrapure water for 10 min and then washed with ultrapure water. A solution of 2 mg/ml of anti-myoglobin monoclonal mouse antibodies in 10 mM sodium acetate buffer, adjusted to pH=5, was prepared and the waveguide surfaces were incubated in it for 2 h. A 2.8 ng/mm$^2$ surface concentration of antibodies was obtained.

Example 6

Polymer made from Dextran Modified with Acetoacetoxy and Phosphate Ester

A mixture of 10 g of dextran (MW=40,000 g/mol), 7 g of tert-butyl acetoacetate, 100 g of DMSO and 0.5 g of polyphosphoric acid was heated for 4 h to 80° C. After cooling, the solution was adjusted in ethanol to a concentration of 1 mg of polymer per ml of solution, and the waveguide surfaces were incubated in this solution for 8 h. The waveguides were then washed with ethanol and 10 mM NaOH. A solution of 2 mg/ml of streptavidin in 10 mM sodium acetate buffer, adjusted to pH=5, was prepared and the waveguide surfaces were incubated in it for 2 h. A 4.5 ng/mm$^2$ surface concentration of streptavidin was obtained.

Example 7

Polymer made from Phosphonate-Functional Polylysine 500 mg of poly-L-lysin hydrobromide (MW=150,000 to 300,000 g/mol), 170 mg of phosphoric acid and 4 ml of water was heated to 100° C., and then 324 mg of formaldehyde (37% strength) were added. The mixture was stirred for 1 h at 100° C. After cooling, the solution was adjusted in ethanol to a concentration of 1 mg of polymer per ml of solution, and the waveguide surfaces were incubated in this solution for 2 h. The waveguides were then washed with ethanol and 10 mM NaOH. The surfaces were incubated with a solution of 10 mg/ml of carboxymethyldextran (MW=15,000 g/mol), 0.1 M of N-hydroxysuccinimide and 0.1 M of N-dimethylamino-propyl-N'-ethyl-carbodiimide hydrochloride in ultrapure water for 20 min. The surfaces were then washed briefly with ultrapure water and immediately incubated with 0.1 mg/ml of an amine-functionalized DNA (20 nucleotides) in 10 mM sodium acetate buffer (pH=5). A 0.5 ng/mm$^2$ surface concentration of DNA was obtained.

The invention claimed is:

1. A method comprising:
    (a) providing a phosphorus-containing polymer of the general formula I or II, $$P(A)_m(F)_{n1}(U)_{o1} \quad (I)$$

$$P(A)_m(UF_{n2})_{o2} \quad (II)$$

wherein P represents a linear or branched, uncrosslinked or crosslinked, homo- or heteropolymeric polymer component, A represents identical or different phosphorus-containing groups bonded to P, m represents a number from 3 to 1000, F represents identical or different functional groups bonded directly or indirectly to P which are present in addition to A, n1 represents a number from 1 to 1000, n2 represents a number from 1 to 100, U represents identical or different, linear or branched, uncrosslinked or crosslinked oligomeric or polymeric segments made up of identical or different monomers, which are bonded to P, o1 represents a number from 0 to 1000, and o2 represents a number from 1 to 1000;
    (b) applying the polymer to a dielectric waveguide so as to form a coating on the dielectric waveguide; and
    (c) forming an optical signal transducer comprising the coated dielectric waveguide.

2. The method according to claim 1, wherein P represents a linear or branched, uncrosslinked homo- or heteropolymeric polymer component selected from the group consisting of: i) polyvinyl alcohols, polyvinyl amine, polyallyl amine, polyethylene imine, imides of polymaleic anhydride-alt-methyl vinyl ether or derivatives thereof; ii) linear polyethylene glycols, polypropylene glycols or derivatives thereof; iii) branched or star-branched polyethylene glycols; iv) polyureas, polyurethanes, polyesters, polycarbonates, polyhydroxycarboxylic acids or derivatives thereof, which are made up of diols/polyols and/or diamines/polyamines; v) polysaccharides as cellulose, starch, agarose, dextran, chitosan, hyaluronic acid or derivatives thereof; vi) polypeptides or derivatives thereof which are made of one or more various amino acids; and vii) branched polyols based on glycidol.

3. The method according to claim 1, wherein phosphorus-containing groups A are present in the polymer in an amount of from 0.001 to 10 mEq.

4. The method according to claim 1, wherein functional groups F are present in the polymer in an amount of from 0.001 to 20 mEq.

5. The method according to claim 1, wherein segments U are present in the polymer in an amount of from 0.001 to 20 mEq.

6. The method according to claim 1, wherein the polymer has a Mw of from 1000 to 10,000,000 g/mol.

7. The method according to claim 1, wherein the dielectric waveguide comprises at least one material selected from the group consisting of $TiO_2$, $Ta_2O_5$, $ZrO_2$, $HfO_2$ and $Al_2O_3$.

8. The method according to claim 1, wherein the dielectric waveguide comprises at least one material selected from the group consisting of $TiO_2$ and $Ta_2O_5$.

9. An optical signal transducer comprising a coated dielectric waveguide prepared by the method according to claim 1.

10. An optical signal transducer comprising a dielectric waveguide, wherein the dielectric waveguide has a coating comprising a phosphorus-containing polymer of the general formula I or II, $$P(A)_m(F)_{n1}(U)_{o1} \quad (I)$$

$$P(A)_m(UF_{n2})_{o2} \quad (II)$$

wherein P represents a linear or branched, uncrosslinked or crosslinked, homo- or heteropolyineric polymer component, A represents identical or different phosphorus-containing groups bonded to P, m represents a number from 3 to 1000, F represents identical or different functional groups bonded directly or indirectly to P which are present in addition to A, n1 represents a number from 1 to 1000, n2 represents a number from 1 to 100, U represents identical or different, linear or branched, uncrosslinked or crosslinked oligomeric or polymeric segments made up of identical or different monomers, which are bonded to P, o1 represents a number from 0 to 1000, and o2 represents a number from 1 to 1000.

11. The optical signal transducer according to claim 10, wherein P represents a linear or branched, uncrosslinked homo- or heteropolymeric polymer component selected from the group consisting of: i) polyvinyl alcohols, polyvinyl amine, polyallyl amine, polyethylene imine, imides of polymaleic anhydride-alt-methyl vinyl ether or derivatives thereof; ii) linear polyethylene glycols, polypropylene glycols or derivatives thereof; iii) branched or star-branched polyethylene glycols; iv) polyureas, polynrethanes, polyesters, polycarbonates, polyhydroxycarboxylic acids or derivatives thereof, which are made up of diols/polyols and/or diamines/polyamines; v) polysaccharides as cellulose, starch, agarose, dextran, chitosan, hyaluronic acid or derivatives thereof; vi) polypeptides or derivatives thereof which are made of one or more various amino acids; and vii) branched polyols based on glycidol.

12. The optical signal transducer according to claim 10, wherein phosphorus-containing groups A are present in the polymer in an amount of from 0.001 to 10 mEq.

13. The optical signal transducer according to claim 10, wherein functional groups F are present in the polymer in an amount of from 0.001 to 20 mEq.

14. The optical signal transducer according to claim 10, wherein segments U are present in the polymer in an amount of from 0.001 to 20 mEq.

15. The optical signal transducer according to claim 10, wherein the polymer has a Mw of from 1000 to 10,000,000 g/mol.

16. The optical signal transducer according to claim 10, wherein the dielectric waveguide comprises at least one material selected from the group consisting of $TiO_2$, $Ta_2O_5$, $ZrO_2$, $HfO_2$ and $Al_2O_3$.

17. The optical signal transducer according to claim 10, wherein the dielectric waveguide comprises at least one material selected from the group consisting of $TiO_2$ and $Ta_2O_5$.

18. A method comprising: exposing the optical signal transducer according to claim 10 to a fluid comprising at least one chemical and/or biochemical recognition element; and immobilizing the recognition element on the coating on the dielectric waveguide.

* * * * *